United States Patent
Yang et al.

(10) Patent No.: US 9,665,546 B1
(45) Date of Patent: *May 30, 2017

(54) REAL-TIME WEB SERVICE RECONFIGURATION AND CONTENT CORRECTION BY DETECTING IN INVALID BYTES IN A CHARACTER STRING AND INSERTING A MISSING BYTE IN A DOUBLE BYTE CHARACTER

(71) Applicant: International Business Machines Corporation, Armonk, NY (US)

(72) Inventors: Fan Yang, Beijing (CN); Su Liu, Austin, TX (US); Priya Paul, Austin, TX (US); Jun Su, Beijing (CN); Cheng Xu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/972,200

(22) Filed: Dec. 17, 2015

(51) Int. Cl.
*G06F 17/22* (2006.01)
*G06F 17/27* (2006.01)
*G06F 17/28* (2006.01)
*H04L 29/08* (2006.01)
*G06F 17/24* (2006.01)

(52) U.S. Cl.
CPC ...... *G06F 17/2217* (2013.01); *G06F 17/2205* (2013.01); *G06F 17/2211* (2013.01); *G06F 17/2223* (2013.01); *G06F 17/2247* (2013.01); *G06F 17/24* (2013.01); *G06F 17/275* (2013.01); *G06F 17/28* (2013.01); *G06F 17/289* (2013.01); *G06F 17/2863* (2013.01); *H04L 67/02* (2013.01); *H04L 67/306* (2013.01)

(58) Field of Classification Search
CPC ............. G06F 17/2217; G06F 17/2223; G06F 17/275; G06F 17/28; G06F 17/2863
USPC ................................................... 715/264, 265
See application file for complete search history.

(56) References Cited

U.S. PATENT DOCUMENTS 5,005,137 A * 4/1991 Ernst ...................... G06F 3/1415
709/231
5,537,628 A * 7/1996 Luebbert ................. G06F 17/24
715/208

(Continued)

OTHER PUBLICATIONS

Wikipedia, The Free Encyclopedia, "Charset detection," wikipedia. org, https://en.wikipedia.org/w/index.php?title=Charset_detection &printable=yes, printed on Dec. 14, 2015, pp. 1-2.

(Continued)

*Primary Examiner* — Cesar Paula
*Assistant Examiner* — Yahao Chen
(74) *Attorney, Agent, or Firm* — Teddi E. Maranzano (57) ABSTRACT

Real-time web service reconfiguration and content correction is provided. A web browser receives one or more webpages, each webpage including one or more frames. The received webpages are saved from the web content buffer to a temporary work area. The profile settings in a web browser profile are compared to the respective settings in the saved webpages. The web browser profile settings include lang, script and charset. Differences between the web browser profile and the settings in the saved webpages are detected and corrected to use the preferred setting from the web browser profile.

17 Claims, 4 Drawing Sheets

(56) References Cited

U.S. PATENT DOCUMENTS

| | | | | |
|---|---|---|---|---|
| 6,049,869 | A * | 4/2000 | Pickhardt | G06F 17/30985 707/E17.041 |
| 6,246,976 | B1 * | 6/2001 | Mukaigawa | G06F 17/2217 704/9 |
| 6,360,197 | B1 * | 3/2002 | Wu | G06F 17/274 704/9 |
| 6,400,287 | B1 * | 6/2002 | Ehrman | G06F 3/0219 341/22 |
| 6,539,118 | B1 * | 3/2003 | Murray | G06F 17/2217 382/218 |
| 6,701,320 | B1 * | 3/2004 | Marple | G06F 17/2217 707/758 |
| 7,051,278 | B1 | 5/2006 | Ehrman | |
| 7,103,532 | B1 * | 9/2006 | Murray | G06F 17/275 704/2 |
| 7,148,824 | B1 * | 12/2006 | Porter, III | G06F 17/2217 341/51 |
| 7,386,438 | B1 * | 6/2008 | Franz | G06F 17/275 704/240 |
| 7,957,954 | B2 | 6/2011 | Chen et al. | |
| 8,086,999 | B2 | 12/2011 | Berstis et al. | |
| 8,264,385 | B1 * | 9/2012 | Dewan | G06F 11/3692 341/50 |
| 8,281,236 | B2 | 10/2012 | Gundorov | |
| 8,566,080 | B2 * | 10/2013 | Li | G06F 17/2223 704/6 |
| 2003/0033334 | A1 * | 2/2003 | Banerjee | H04L 67/02 715/256 |
| 2003/0070137 | A1 * | 4/2003 | McCarley | G06F 8/447 714/794 |
| 2004/0117732 | A1 * | 6/2004 | McNeill | G06Q 10/10 715/229 |
| 2004/0267867 | A1 * | 12/2004 | Christian | H04L 29/06 709/200 |
| 2005/0188308 | A1 * | 8/2005 | Schultz | G06F 17/2217 715/261 |
| 2008/0102900 | A1 * | 5/2008 | Lazaridis | G06F 3/0481 455/566 |
| 2009/0199085 | A1 * | 8/2009 | Park | G06F 17/2217 715/234 |
| 2010/0057439 | A1 | 3/2010 | Ideuchi et al. | |
| 2010/0278427 | A1 * | 11/2010 | Li | G06F 17/2223 382/177 |
| 2012/0046934 | A1 | 2/2012 | Cheng et al. | |
| 2013/0090915 | A1 * | 4/2013 | Clark | G06F 17/28 704/2 |
| 2013/0326347 | A1 | 12/2013 | Albright et al. | |
| 2014/0092020 | A1 * | 4/2014 | Hadar | G06F 17/30861 345/168 |
| 2015/0026828 | A1 * | 1/2015 | Adams | G06F 17/2217 726/30 |
| 2015/0127322 | A1 * | 5/2015 | Clark | G06F 17/28 704/2 |
| 2016/0062965 | A1 * | 3/2016 | Bostick | G06F 17/2223 704/9 |

OTHER PUBLICATIONS

ICU Project, "Character Set Detection," ICU-project.org, http://userguide.icu-project.org/conversion/detection?tmpl=/system/app/ . . . 1%20of, printed on Dec. 14, 2015, pp. 1-8.

Wikipedia, The Free Encyclopedia, "Mojibake," wikipedia.org, https://en.wikipedia.org/w/index.php?title=Mojibake&printable=yes, printed on Dec. 14, 2015, pp. 1-13.

Wikipedia, The Free Encyclopedia, "CJK characters," wikipedia.org, https://en.wikipedia.org/w/index.php?title=CJK_characters&printable=yes, printed on Dec. 14, 2015, pp. 1-3.

IBM, "Cumulative fix history and Readme for HMC 5.2," http://www-01.ibm.com/support/docview.wss?uid=isg3T1012384, printed on Dec. 14, 2015, pp. 1-16.

Ishida, "Authoring HTML: Language declarations," IBM, http://www.w3.org/TR/i18n-html-tech-lang/, printed on Dec. 14, 2015, pp. 1-8.

* cited by examiner

REAL-TIME WEB SERVICE RECONFIGURATION AND CONTENT CORRECTION BY DETECTING IN INVALID BYTES IN A CHARACTER STRING AND INSERTING A MISSING BYTE IN A DOUBLE BYTE CHARACTER

BACKGROUND

This disclosure relates generally to the field of language globalization, and more particularly to real-time web content correction.

Word corruption is one of the most expensive and challenging problems in managing web-based content that includes double-byte or multi-byte characters, for example Chinese (Simplified and Traditional), Japanese, and Korean (CJK), encoded in different coded character sets. Word corruption is a language text presentation problem when web applications or other text rendering applications, such as eBook readers, tablets, or smart phones render text under incorrect character encoding environments. Word corruption is often seen when text is moved between computers having different default encodings. If the encoding is not specified, it is up to the software, for example the operating system or application, to use another means to attempt to render the text correctly. This may include an operating system setting or charset detection, which uses statistical analysis of byte patterns to determine character encoding.

Word corruption can occur in two major categories. The first category, unreadable webpage content, is caused by incorrect or inconsistent lang, script, and charset settings in the header and metadata of the webpages. The second category, corrupted data, occurs when invalid bytes change the string hex sequence, such as data in a file, during processing, transferring, or storing the data. In the corrupted data type of word corruption, an invalid byte is an additional byte or a missing byte in a double-byte or multi-byte character. The first category of word corruption may temporarily inconvenience a user viewing a webpage or mobile device. However in corrupted data word corruption, invalid bytes in hex data strings may alter the meaning of the contents of a file, such as a text document.

SUMMARY

According to one embodiment, a method for real-time web service reconfiguration and content correction is provided. The method includes receiving, by a web browser, one or more webpages, whereby each of the one or more webpages include one or more frames. The one or more received webpages from a web content buffer are saved to a temporary work area. The method compares one or more profile settings in a web browser profile, whereby the one or more profile settings include at least one of: 1) lang, 2) script, and 3) charset, to a respective setting in each frame of the received one or more webpages. The method provides detecting and correcting a difference between one or more of the profile settings and the respective setting in each frame of the received one or more webpages.

According to another embodiment, a computer program product for real-time web service reconfiguration and correction is provided. The computer program product includes a word corruption correction agent (WCCA) embodied on a computer readable storage medium. The WCCA includes program instructions executable by a processor. The program instructions receive, by a web browser, one or more webpages, whereby each of the one or more webpages include one or more frames. The computer program product includes program instructions to save the one or more received webpages from a web content buffer to a temporary work area. The computer program product includes program instructions to compare one or more profile settings in a web browser profile, whereby the one or more profile settings include at least one of: 1) lang, 2) script, and 3) charset, to a respective setting in each frame of the received one or more webpages. The computer program product includes program instructions to detect and correct a difference between one or more of the profile settings and the respective setting in each frame of the received one or more webpages.

According to another embodiment, a computer system for real-time web service reconfiguration and correction is provided. The computer system provides one or more processors, one or more computer-readable storage devices, and a plurality of program instructions stored on at least one of the one or more storage devices for execution by at least one of the one or more processors. The program instructions receive, by a web browser, one or more webpages, whereby each of the one or more webpages include one or more frames. The program instructions save the one or more received webpages from a web content buffer to a temporary work area. The program instructions compare one or more profile settings in a web browser profile, whereby the one or more profile settings include at least one of: 1) lang, 2) script, and 3) charset, to a respective setting in each frame of the received one or more webpages. The program instructions detect and correct a difference between one or more of the profile settings and the respective setting in each frame of the received one or more webpages.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

Embodiments of the present invention relate generally to the field of language globalization, and more particularly to real-time web content correction.

The following described exemplary embodiments provide a system, method and program product having the capacity to improve the technical field of language globalization by providing real-time automatic word corruption analysis and correction for multilingual support, such that the displayed content is consistent, accurate, and coherent to the user. Several language encoding variables, including lang, charset, and script, determine how webpages are displayed. Each webpage may include one or more frames, collectively referred to as a frameset. A user may include settings for one or more of the language encoding variables in a user profile. Unreadable webpage content can result when the settings of the language encoding variables among the frames of the frameset in a webpage conflict with the settings in the user's profile. Unreadable web content impacts the ability of systems administrators to efficiently manage applications, clusters of computer servers, virtual machines, and cloud computing implementations, for example, by displaying inaccurate data. The corrupted data type of word corruption can result when invalid bytes change the string hex sequence of data in a file. Invalid bytes (i.e., an additional byte or a missing byte) in double-byte character set (DBCS) and multi-byte character set (MBCS) character string sequences can materially change the meaning of the character string. This type of word corruption can impact the efficiency and accuracy of information retrieval, data analytics, and data protection applications because the actual data is incorrectly modified.

In current technology, character encoding detection attempts to statistically analyze byte patterns. Object-oriented programming languages provide classes or Application Programming Interfaces (API) to perform character set detection. However, these techniques are imprecise because they rely on heuristics, among other reasons. Current web browsers provide features to manually change browser encoding based on the metadata definitions in the HTTP header fields. However, these techniques are not effective against word corruption problems in webpage framesets because reconciling the root causes of errors in multiple frames of a frameset, such as font, locale settings, and environment settings, is impractical in real-time. For the mobile web browsers that provide an option to change encoding settings, modifying the settings interrupts the user's web browser session.

The real-time word corruption analysis and correction includes a framework to compare language/locale settings between web browser and HTTP metadata definitions in the header fields of a webpage, align codeset encoding settings on multiple frames, convert incompatible contents to a unified encoding scheme, detect invalid bytes, and remove the invalid byte based on predefined rules and algorithms, render correct web contents to a user. The analysis and correction are performed upon the web browser retrieving the requested webpages and prior to displaying the retrieved webpages, thereby making the analysis and correction automatic and transparent to the user.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit", "module", or "system". Furthermore, aspects of the present invention may take the form of a computer program product embodied in one or more computer readable medium(s) having computer readable program code embodied thereon.

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

Figure 1:
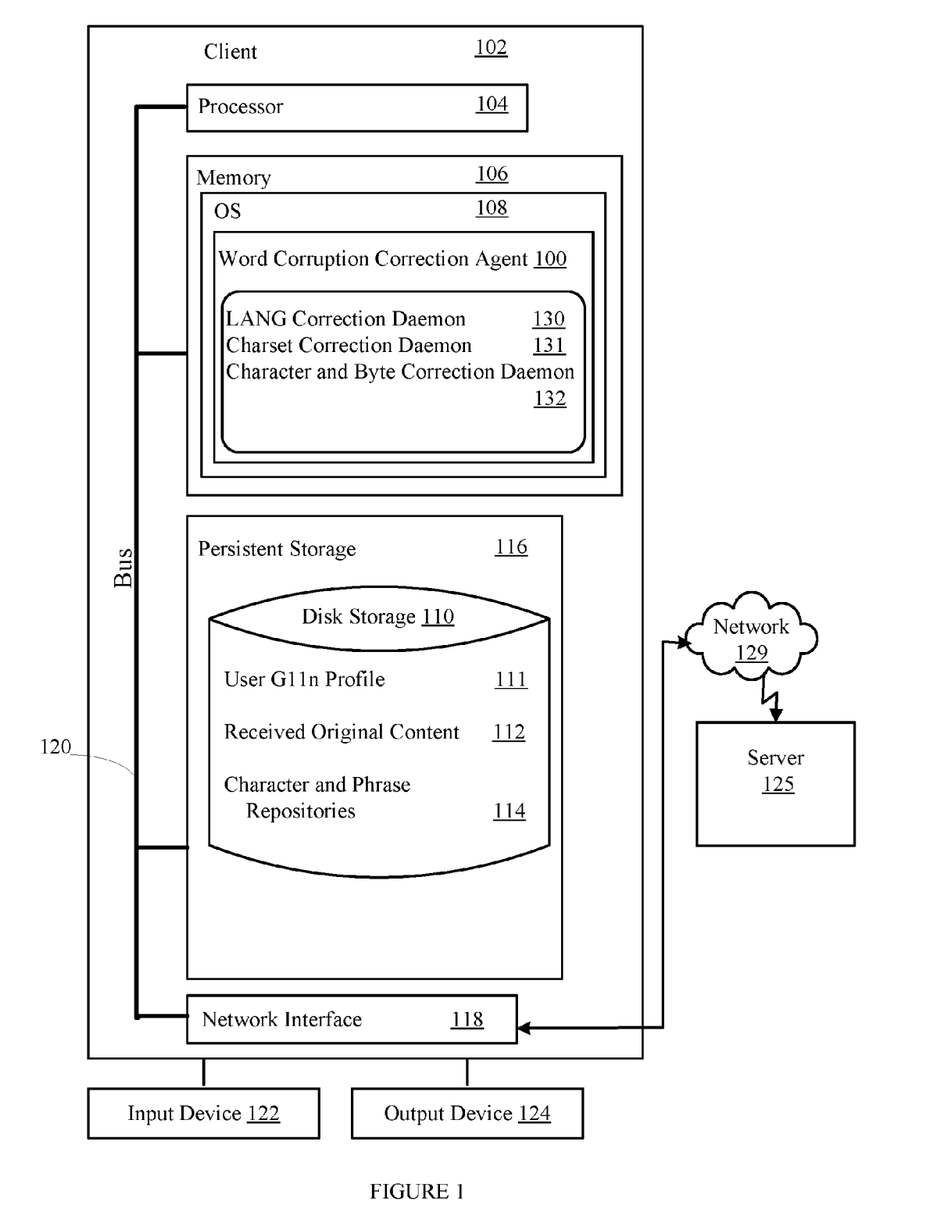
FIG. 1 illustrates an exemplary computer system environment operable for various embodiments of the disclosure.

FIG. 1 illustrates a block diagram of an exemplary data processing system operable for various embodiments of the disclosure. In this illustrative example, the data processing system includes a client 102 providing a word corruption correction agent (WCCA) 100. The client 102 may connect to other client computers and server computers via a network 129. The network 129 may include connections, such as wire, wireless communication links, or fiber optic cables.

The client 102 includes a processor unit 104 that executes instructions for software, for example the operating system (OS) 108 and WCCA 100 (discussed in further detail with respect to FIGS. 2A and 2B) that may be loaded into memory 106. The processor unit 104 may be a set of one or more processors or may be a multi-processor core, depending on the particular implementation. Further, the processor unit 104 is connected, via a bus 120, to memory 106, a network interface device 118, disk storage 110, persistent storage 116, and input device 122, and an output device 124.

The client 102 is generally under the control of an OS 108, such as Linux® (Linux is the registered trademark of Linus Torvalds in the United States, other countries, or both). However, any operating system supporting the functions disclosed herein may be used. The processor 104 is included to be representative of several implementation dependent architectures, such as a single CPU, multiple CPUs, a single CPU having multiple processing cores, and the like. Similarly, the memory 106 may be a random access memory. While the memory 106 is shown as a single identity, it should be understood that the memory 106 may comprise a plurality of modules, and that the memory 106 may exist at multiple levels, from high speed registers and caches to lower speed but larger formats. The network interface device 118 may be any type of network communications device allowing the client 102 to communicate with other computers, including the server 125, via a network 129. The server 125 may act as a server of webpage content or other data in a client/server implementation. The client 102 receives original content 112, such as webpages or other data from the server 125 communicating over the network 129.

Persistent storage 116 may be any device or hardware that is capable of storing information, such as data, an OS 108, and program instructions, including those providing WCCA 100. Persistent storage 116 may take various forms depending on the particular implementation. For example, persistent storage 116 may be disk storage 110, a flash memory, optical disk, magnetic tape, cloud storage devices, or some combination of the above.

Persistent storage 116 can contain instructions for the OS 108 and WCCA 100. Applications and/or programs may be located in persistent storage 116, which is in communication with processor unit 104 through the bus 120 fabric. In these illustrative examples the instructions are in a functional form on persistent storage 116. These instructions may be loaded into memory 106 for execution by processor unit 104. Persistent storage 116 includes predefined rules contained in the user G11n (i.e., language globalization) profile (profile) 111.

The input device 122 may be any device for providing input to the client 102. For example, a keyboard and/or a mouse may be used. The output device 124 may be any device for providing output to a user of the client 102. Although shown separately from the input device 122, the output device 124 and input device 122 may be combined, as in a display screen with an integrated touch-screen.

The WCCA 100 can be provided as a client side browser plugin, or may be implemented in the server 125. The WCCA 100 detects and corrects word corruption prior to displaying the web-based content to the end user. Some webpages may contain more than one frame, whereby the browser window is divided into multiple sections that each can load separate web-based content. The webpage, and each frame, may be written in a markup language, such as HTML, and may include cascading style sheets that describe the presentation of the HTML document. The header/metadata of each frame includes, among other data, language encoding variables (i.e., lang, script, and charset). When the language encoding variables differ among the frames, the webpage, and the user's preferred profile settings, the webpage displays incorrectly (i.e., is unreadable).

The WCCA 100 includes a lang correction daemon (LCD) 130. The lang variable is encoded in documents, such as webpage content and cascading style sheets, to define the language and script used in the webpage. Unreadable webpage content due to font-related word corruption results when the lang variable in one or more frames differs from the lang setting in the user's profile. The LCD 130 normalizes the lang setting based on the user's preferred action in the profile 111.

The WCCA 100 includes a charset correction daemon (CCD) 131. The charset variable specifies how to convert a binary number or code into a displayed character. For example in Unicode, "41" is displayed as "A". Each frame may specify a charset setting. Unreadable webpage content due to mismatched encoding results when the charset setting in one or more frames differ from the charset setting in the user's profile. The CCD 131 converts conflicting charset settings using the preferred action in the profile 111.

The WCCA 100 includes a character and byte correction daemon (CBCD) 132. The CBCD 132 uses natural language computing technologies, such as invalid character scan/match, syntax analysis, and semantic computing, to detect and correct string-level word corruption. In string-level word corruption, either a single byte is missing or an extra byte is added to a character string. The DBCS and MBCS languages, such as Chinese (Traditional and Simplified), Japanese, and Korean (CJK), require at least two bytes to encode a character (such as Shift_JIS and GB18030). Omitting or adding a byte materially changes the meaning of the character string. The CBCD 132 detects and corrects string-level word corruption based on the user's preferred action in the profile 111. The CBCD 132 may use one or more character and phrase repositories (repositories) 114 to correct detected word corruption. The repositories 114 may include known frequently corrupted words, characters and phrases.

As will be discussed with reference to FIG. 4, the client 102 and the server 125 may include internal components 800 and external components 900.

Figure 2A:
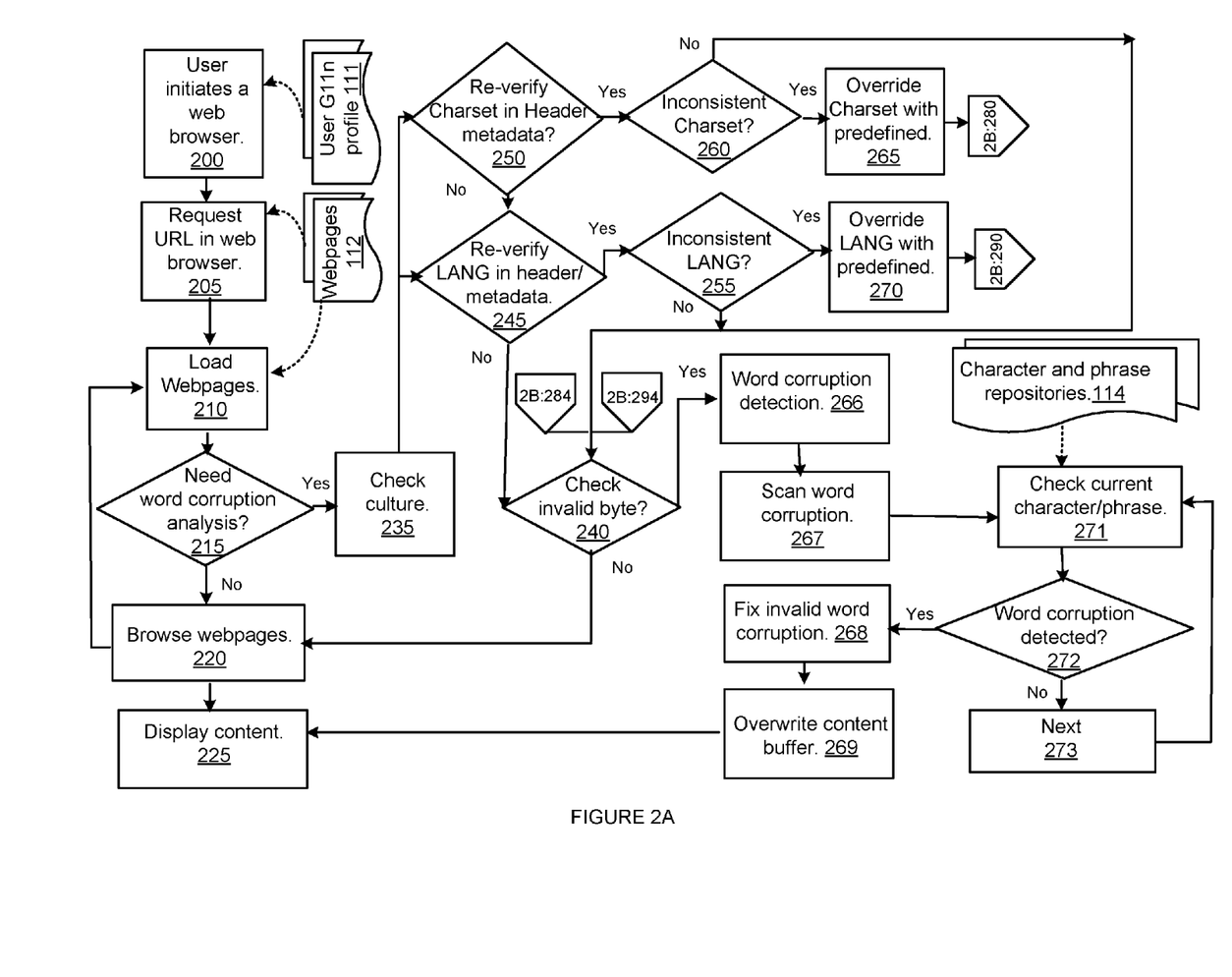
FIGS. 2A-2B illustrates components and algorithms associated with word corruption correction, according to various embodiments of the disclosure.

FIG. 2A illustrates components and algorithms associated with WCCA 100 (FIG. 1). The WCCA 100 loads the user's profile 111 when the user initiates a web browser session at 200. The profile 111 is configurable and includes the user's predefined rules for preferred lang, charset, and script. The profile 111 also specifies which real-time word corruption feature, or combination of features, if any, is activated.

At 205, the web browser may request a Uniform Resource Locator (URL) address, which may invoke any internet-based application. The web browser may also act as a graphical user interface (GUI) to an administrative interface for managing computer servers, cloud computing implementations, and other computing hardware.

At 210, as they are returned, the WCCA 100 intercepts the original content 112 webpages and temporarily stores them in persistent storage 116 (FIG. 1). At 215, the WCCA 100 then checks the profile 111 to determine whether word corruption analysis is enabled.

Up to three levels of word corruption analysis and correction may be enabled, alone or in combination. The first level ensures that the language settings are consistent in the web-based frames, and with the preferred settings in the profile 111. The language is a component of the locale, which is a set of parameters that describes a user's language, region, and script. Together, these parameters may be referred to as the user's culture. The region, or geography may specify linguistic variations, associated with a country, territory, or region. Such variations may include regional dialects, usage, or spelling conventions. The script specifies writing system variations that distinguish the written forms of a language or its dialects. For example, the Chinese language defines two scripts: Simplified and Traditional. In the profile 111, the lang attribute declares the language of a portion or all of a webpage, for example: <HTML lang="en">.

The second level ensures that the charset, i.e., codeset, settings are consistent in the web-based frames. The charset specifies a character set for converting a binary number or code into a written language character, for example: <meta charset="UTF-8"> or <meta charset="GB18030">. The third level performs byte correction by adding and/or removing bytes in DBCS and MBCS to recover content. The user may enable the levels in any combination. If none of the word corruption correction functions are enabled, then at 220 the user may browse webpages without interception, and the WCCA 100 displays the content at 225.

Returning to 215, if one or more of the word corruption correction function is enabled, at 235 the WCCA 100 checks the lang, script, charset and region settings in the profile 111, also referred to as the culture.

At 250, the WCCA 100 checks if charset verification should be performed on the header/metadata in the temporarily stored original content 112 webpages. Then, at 260 if the charset setting in the original content 112 differs from the profile 111 setting, at 265 the WCCA 100 calls the CCD 131 to override the setting in the original content 112 with the setting from the profile 111 and continue processing the charset verification. However if at 260 the charset setting in the original content 112 is consistent with the profile 111 setting, the WCCA 100 continues to 240 to check whether word corruption correction at the byte level should be performed.

Figure 2B:
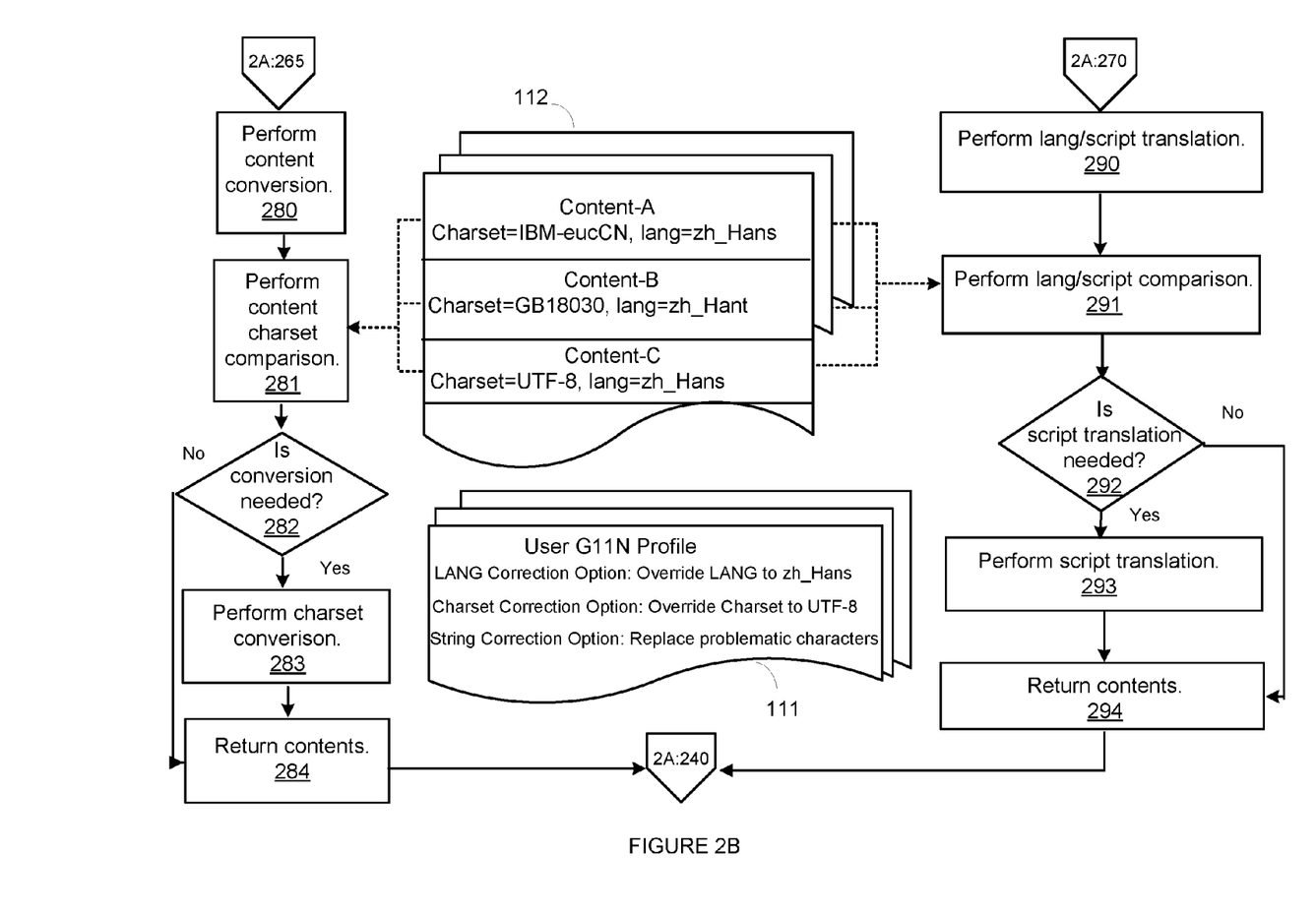

Continuing now to FIG. 2B, at 280 the CCD 131 applies the preferred charset setting and converts the content to the preferred charset. For each frame, at 281 the CCD 131 scans the content to locate the charset setting, and to compare each of the charset settings in the original content 112 with the preferred charset from the profile 111. In the three example frame, Content-A specifies the charset of IBM-eucCN, Content-B specifies GB18030, and Content-C specifies UTF-8. UTF-8 is the preferred charset setting in the profile 111. Therefore, at 282 conversion is needed. At 283, the CCD 131 (FIG. 1) substitutes UTF-8 into Content-A and Content-B, and invokes the web browser to perform the charset conversion. At 284, the CCD 131 returns control to the WCCA 100 at 240 to check whether word corruption correction at the byte level should be performed.

Returning now to FIG. 2A, if at 250 charset verification is not set in the profile 111, at 245 the WCCA 100 checks if LANG verification should be performed on the header/metadata in the temporarily stored original content 112 webpages. Then, at 255 if the lang setting in the original content 112 differs from the profile 111 setting, at 270 the WCCA 100 calls the LCD 130 (FIG. 1) to override the setting in the original content 112 with the setting from the profile 111 and continue processing the lang verification. However if at 255 the lang setting in the original content 112 is consistent with the profile 111 setting, the WCCA 100 continues to 240 to check whether word corruption correction at the byte level should be performed.

Continuing now to FIG. 2B, at 290 the LCD 130 applies the preferred lang setting and converts the content to the preferred lang. For each frame, at 291 the LCD 130 scans the content to locate the lang setting, and to compare each of the lang settings in the original content 112 with the preferred lang from the profile 111. In the three example frame, Content-A specifies the lang of zh_Hans, Content-B specifies zh_Hant, and Content-C specifies zh_Hans. The preferred lang setting in the profile 111 is zh_Hans. Therefore, at 292 conversion is needed. At 293, the LCD 130 (FIG. 1) substitutes zh_Hans into Content-B, and invokes the web browser to perform the lang conversion. At 284, the LCD 130 returns control to the WCCA 100 at 240 to check whether word corruption correction at the byte level should be performed.

Returning now to FIG. 2A, if at 240 byte correction is not set in the profile 111, then the user may continue to browse web content at 220, which the WCCA 100 displays at 225. However, if byte correction is set in the profile 111, the WCCA 100 invokes the CBCD 132 at 266 to detect and correct word corruption.

The previous levels of word corruption correction apply to content presentation problems. Only the contents of a temporary work buffer are changed as a result of the lang or charset correction procedure. Byte correction is not a presentation problem, but is damage to data in a file, including data files, database tables, and text documents. At 267, the CBCD 132 places the data to scan into a temporary work buffer. The CBCD 132 may use any natural language computing technologies, such as invalid character scan/match, syntax analysis, and semantic analysis, to detect and repair word corruption on a string level. The repositories 114 may be known repositories, or customized repositories based on the implementation requirements. At 271 the CBCD 132 uses the repositories 114 to compare against the current character or phrase. The repositories 114 may include frequently used phrases, commonly combined characters, and words and phrases that are statistically known to be frequently misrepresented. Each character is scanned and its hex value is compared to character mapping tables, frequency tables, and related word/phrase repositories. In the example character string, after applying natural language analysis using the repositories 114, the CBCD 132 suggests to insert the missed byte 0x5C (hex) into "0xDF D7F7D6B8CABEB5C6" for correcting the string: 0xDF 5CD7F7D6B8CABEB5C6 (運作指示灯 operation indication lamp, encoded in GB18030 charset).

If word corruption is detected at 272, the CBCD 132 repairs the byte in error at 268 and places the correction in the work buffer (step 269). If no corruption is detected, the CBCD 132 continues to the next byte, phrase, or block of data (step 273) until all of the input data is scanned and corrected as needed. At completion, the CBCD 132 corrects the file contents using the corrected work buffer. Finally, at 225 the corrected work buffer is displayed to the user.

Figure 3:
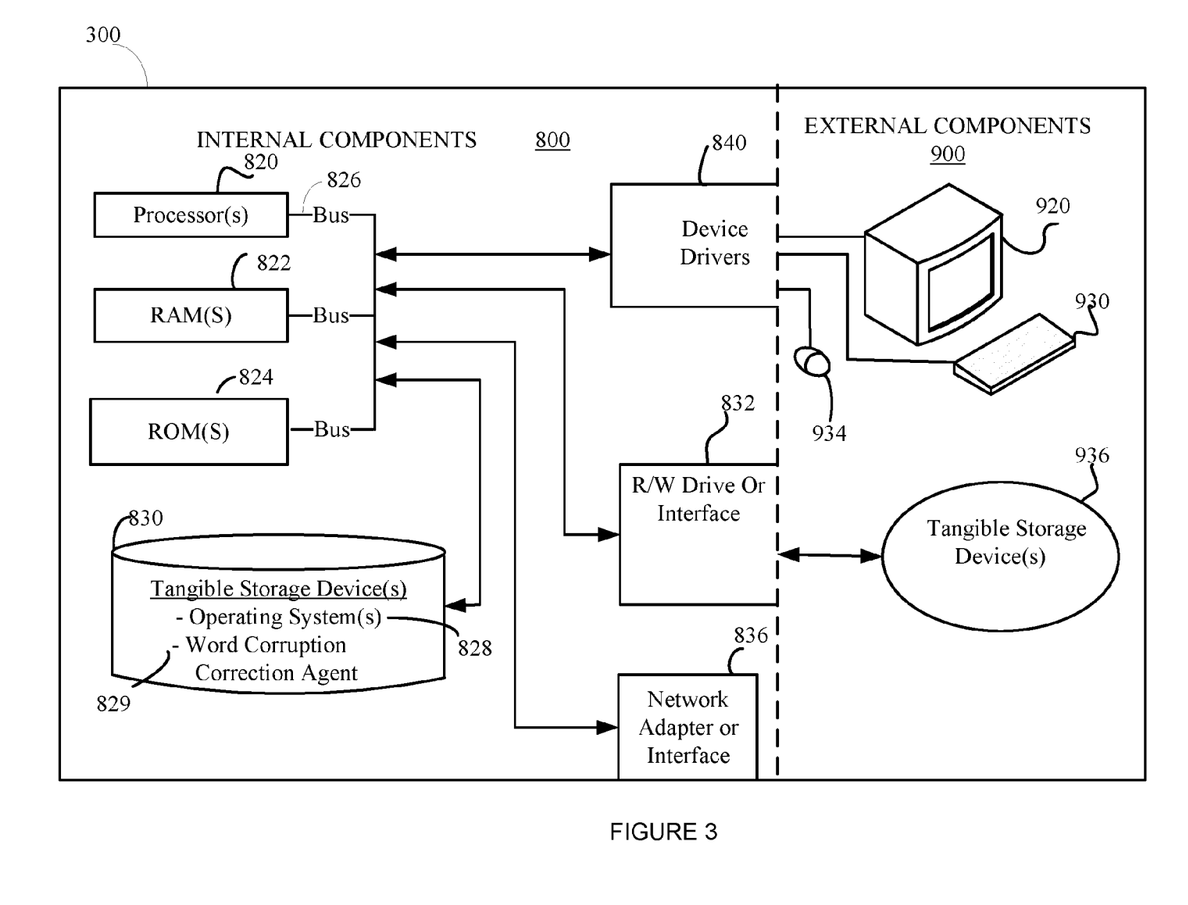
FIG. 3 is a schematic block diagram of hardware and software of the computer environment according to an embodiment of the process of FIGS. 2A-2B.

FIG. 3 illustrates an exemplary computing device 300 applicable for executing the algorithm of FIGS. 2A and 2B. Computing device 300 may include respective sets of internal components 800 and external components 900 that together may provide an environment for a software application, such a word corruption correction agent (WCCA). Each of the sets of internal components 800 includes one or more processors 820; one or more computer-readable RAMs 822; one or more computer-readable ROMs 824 on one or more buses 826; one or more operating systems 828; one or more software applications (e.g., WCCA 829) executing the method illustrated in FIGS. 2A and 2B; and one or more computer-readable tangible storage devices 830. The one or more operating systems 828 and WCCA modules 829 are stored on one or more of the respective computer-readable tangible storage devices 830 for execution by one or more of the respective processors 820 via one or more of the respective RAMs 822 (which typically include cache memory). In the embodiment illustrated in FIG. 3, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 also includes a R/W drive or interface 832 to read from and write to one or more computer-readable tangible storage devices 936 such as a CD-ROM, DVD, SSD, memory stick, magnetic tape, magnetic disk, optical disk or semiconductor storage device.

Each set of internal components 800 may also include network adapters (or switch port cards) or interfaces 836 such as a TCP/IP adapter cards, wireless WI-FI interface cards, or 3G or 4G wireless interface cards or other wired or wireless communication links. The WCCA modules 829, and operating system 828 that are associated with computing device 300, can be downloaded to computing device 300 from an external computer (e.g., server) via a network (for example, the Internet, a local area network, or other wide area network) and respective network adapters or interfaces 836. From the network adapters (or switch port adapters) or interfaces 836 and operating system 828 associated with computing device 300 are loaded into the respective tangible storage device 830 and network adapter 836. The network may comprise copper wires, optical fibers, wireless transmission, routers, firewalls, switches, gateway computers and/or edge servers.

Each of the sets of external components 900 can include a computer display monitor 920, a keyboard 930, and a computer mouse 934. External components 900 can also include touch screens, virtual keyboards, touch pads, pointing devices, and other human interface devices. Each of the sets of internal components 800 also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Various embodiments of the invention may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although preferred embodiments have been depicted and described in detail herein, it will be apparent to those skilled in the relevant art that various modifications, additions, substitutions and the like can be made without departing from the spirit of the disclosure, and these are, therefore, considered to be within the scope of the disclosure, as defined in the following claims.

What is claimed is:

1. A processor-implemented method for real-time web service reconfiguration and content correction comprising:
   receiving, by a web browser, one or more webpages, wherein each of the one or more webpages include one or more frames;
   saving the one or more received webpages from a web content buffer to a temporary work area;
   comparing one or more profile settings in a web browser profile, wherein the one or more profile settings include at least one of: 1) lang, 2) script, and 3) charset, to a respective setting in each frame of the received one or more webpages; and
   detecting invalid bytes in a character string in the saved webpage, wherein the detecting further comprises:
      calculating one or more invalid bytes in the character string, based on one or more natural language computing technologies and one or more character and phrase repositories, wherein an invalid byte includes a missing byte in a double byte character;
      altering the saved webpage by adding the missing byte; and
      refreshing the web content buffer with the altered saved webpage.

2. The method of claim 1, further comprising:
   aligning the lang and the script setting in each frame of the saved webpage with the lang and the script setting in the web browser profile;
   translating the saved webpage to the aligned lang and the script setting; and
   displaying the translated content of the saved webpage.

3. The method of claim 1, further comprising:
   aligning the charset setting in each frame of the saved webpage with the charset setting in the web browser profile;
   converting the saved webpage to the aligned charset setting; and
   displaying the converted content of the saved webpage.

4. The method of claim 1, wherein the web browser profile settings corrects one or more of lang, script, charset, and string-level byte corruption, based on the web browser profile setting being included in the web browser profile and based on the web browser profile settings including a preferred setting.

5. The method of claim 1, wherein the detecting and correcting is performed automatically in real-time, based on the web browser profile settings.

6. The method of claim 1, wherein the detecting and correcting is performed on double byte character sets and multi-byte character sets, based on the web browser profile settings.

7. A computer program product for real-time web service reconfiguration and content correction comprising a non-transitory computer readable storage medium readable by a processor and storing instructions for execution by the processor, the instructions comprising:
   a word corruption correction agent (WCCA) embodied on a computer readable storage medium, the WCCA including program instructions executable by a processor, the program instructions comprising:
   program instructions to receive, by a web browser, one or more webpages, wherein each of the one or more webpages include one or more frames;
   program instructions to save the one or more received webpages from a web content buffer to a temporary work area;
   program instructions to compare one or more profile settings in a web browser profile, wherein the one or more profile settings include at least one of: 1) lang, 2) script, and 3) charset, to a respective setting in each frame of the received one or more webpages; and
   program instructions to detect invalid bytes in a character string in the saved webpage, wherein the program instructions to detect further comprise;
      program instructions to calculate one or more invalid bytes in the character string, based on one or more natural language computing technologies and one or more character and phrase repositories, wherein an invalid byte includes a missing byte in a double byte character;
      program instructions to alter the saved webpage by adding the missing byte; and
      program instructions to refresh the web content buffer with the altered saved webpage.

8. The computer program product of claim 7, further comprising:
   program instructions to align the lang and the script setting in each frame of the saved webpage with the lang and the script setting in the web browser profile;
   program instructions to translate the saved webpage to the aligned lang and the script setting; and
   program instructions to display the translated content of the saved webpage.

9. The computer program product of claim 7, further comprising:
   program instructions to align the charset setting in each frame of the saved webpage with the charset setting in the web browser profile;
   program instructions to convert the saved webpage to the aligned charset setting; and
   program instructions to display the converted content of the saved webpage.

10. The computer program product of claim 7, wherein the web browser profile settings corrects one or more of lang, script, charset, and string-level byte corruption, based on the web browser profile setting being included in the web browser profile and based on the web browser profile settings including a preferred setting.

11. The computer program product of claim 7, wherein the program instructions to detect and correct are performed automatically in real-time, based on the web browser profile settings, and wherein the program instructions to detect and correct are performed on double byte character sets and multi-byte character sets, based on the web browser profile settings.

12. A computer system for real-time web service reconfiguration and correction comprising:
one or more processors, one or more computer-readable storage devices, and a plurality of program instructions stored on at least one of the one or more storage devices for execution by at least one of the one or more processors, the plurality of program instructions comprising:
program instructions to receive, by a web browser, one or more webpages, wherein each of the one or more webpages include one or more frames;
program instructions to save the one or more received webpages from a web content buffer to a temporary work area;
program instructions to compare one or more profile settings in a web browser profile, wherein the one or more profile settings include at least one of: 1) lang, 2) script and 3) charset, to a respective setting in each frame of the received one or more webpages; and
program instructions to detect invalid bytes in a character string in the saved webpage, wherein the program instructions to detect comprise;
program instructions to calculate one or more invalid bytes in the character string, based on one or more natural language computing technologies and one or more character and phrase repositories, wherein an invalid byte includes a missing byte in a double byte character;
program instructions to alter the saved webpage by adding the missing byte; and program instructions to refresh the web content buffer with the altered saved webpage.

13. The computer system of claim 12, wherein the program instructions to compile further comprise:
program instructions to align the lang and the script setting in each frame of the saved webpage with the lang and the script setting in the web browser profile;
program instructions to translate the saved webpage to the aligned lang and the script setting; and
program instructions to display the translated content of the saved webpage.

14. The computer system of claim 12, further comprising:
program instructions to align the charset setting in each frame of the saved webpage with the charset setting in the web browser profile;
program instructions to convert the saved webpage to the aligned charset setting; and
program instructions to display the converted content of the saved webpage.

15. The computer system of claim 12, wherein the web browser profile settings corrects one or more of lang, script, charset, and string-level byte corruption, based on the web browser profile setting being included in the web browser profile and based on the web browser profile settings including a preferred setting.

16. The computer system of claim 12, wherein the program instructions to detect and correct are performed automatically in real-time, based on the web browser profile settings.

17. The computer system of claim 12, wherein the program instructions to detect and correct are performed on double byte character sets and multi-byte character sets, based on the web browser profile settings.

* * * * *